(12) United States Patent
Wright

(10) Patent No.: US 8,544,768 B2
(45) Date of Patent: Oct. 1, 2013

(54) SELF REGULATING FLUID BEARING HIGH PRESSURE ROTARY NOZZLE WITH BALANCED THRUST FORCE

(75) Inventor: Douglas E. Wright, Durango, CO (US)

(73) Assignee: Stoneage, Inc., Durango, CO (US)

( * ) Notice: Subject to any disclaimer, the term of this patent is extended or adjusted under 35 U.S.C. 154(b) by 707 days.

(21) Appl. No.: 12/829,661

(22) Filed: Jul. 2, 2010

(65) Prior Publication Data

US 2011/0108636 A1    May 12, 2011

Related U.S. Application Data

(60) Provisional application No. 61/259,944, filed on Nov. 10, 2009.

(51) Int. Cl.
*B05B 3/04* (2006.01)

(52) U.S. Cl.
USPC ........ 239/225.1; 239/251; 239/259; 239/263; 239/264

(58) Field of Classification Search
USPC .............. 239/225.1, 237, 238, 251, 254, 256, 239/259, 261, 263, 264, 380–383, 461, 487–489, 239/DIG. 8; 277/401
See application file for complete search history.

(56) References Cited

U.S. PATENT DOCUMENTS

| | | |
|---|---|---|
| 3,623,667 A | 11/1971 | Costa |
| 4,241,464 A | 12/1980 | Buckwalter |
| 5,328,097 A | 7/1994 | Wesch et al. |
| 5,395,053 A | 3/1995 | Frech |
| 5,685,487 A | 11/1997 | Ellis |
| 5,823,435 A | 10/1998 | Morgan et al. |
| 5,909,848 A | 6/1999 | Zink |
| 5,947,387 A | 9/1999 | Zink et al. |
| 5,964,414 A * | 10/1999 | Hardy et al. ................ 239/252 |
| 5,975,430 A | 11/1999 | Larsen |
| 6,193,169 B1 | 2/2001 | Steinhilber et al. |
| 6,766,967 B2 | 7/2004 | Harris et al. |

(Continued)

FOREIGN PATENT DOCUMENTS

| | | |
|---|---|---|
| DE | 3925284 | 2/1991 |
| EP | 0314629 | 7/1992 |

(Continued)

OTHER PUBLICATIONS

Extended European Search Report, dated Jan. 16, 2012, from corresponding European Patent Application No. 10830525.1.

(Continued)

*Primary Examiner* — Jason Boeckmann
(74) *Attorney, Agent, or Firm* — Greenberg Traurig, LLP

(57) ABSTRACT

A fluid bearing nozzle assembly is disclosed that has a hollow cylindrical body, an inlet nut fastened to the cylindrical body, and a hollow tubular shaft member coaxially carried within the housing body and captured between the inlet nut and the body. The inlet nut has a stem portion extending into a central bore through the shaft member forming an inlet bearing area rotatably carrying the shaft member thereon. The shaft member has a spray head fastened thereto for rotation of the head with the shaft member. An inner wall of the housing body and an outer portion of the shaft have complementary shapes forming a regulating passage therebetween. The shaft has helical grooves that spiral around the shaft to one or both ends to impart rotation to the shaft and spray head.

25 Claims, 2 Drawing Sheets

(56) References Cited

U.S. PATENT DOCUMENTS

| | | |
|---|---|---|
| 7,552,878 B2 | 6/2009 | Jager |
| 7,635,096 B2 * | 12/2009 | Wright et al. ............ 239/259 |
| 8,220,724 B2 * | 7/2012 | Wright ..................... 239/259 |
| 8,298,349 B2 * | 10/2012 | Wojciechowski, Iii et al. ................... 134/167 C |
| 2004/0016540 A1 | 1/2004 | Jarchau et al. |
| 2006/0273194 A1 | 12/2006 | Kapich |
| 2008/0265058 A1 | 10/2008 | Wimmer |
| 2009/0102189 A1 * | 4/2009 | Wright et al. ............ 285/272 |
| 2009/0113642 A1 | 5/2009 | Zingoni |

FOREIGN PATENT DOCUMENTS

| | | |
|---|---|---|
| JP | 2008-194611 | 8/2008 |
| JP | 4167583 | 10/2008 |
| SU | 1231278 | 5/1986 |
| WO | WO 2007/053229 | 5/2007 |

OTHER PUBLICATIONS

International Search Report and Written Opinion, dated Jul. 22, 2011, from corresponding International Application No. PCT/US2010/054992.

* cited by examiner

SELF REGULATING FLUID BEARING HIGH PRESSURE ROTARY NOZZLE WITH BALANCED THRUST FORCE

CROSS-REFERENCE TO RELATED APPLICATIONS

This application claims the benefit of priority to U.S. Provisional Patent Application Ser. No. 61/259,944, filed Nov. 10, 2009.

BACKGROUND OF THE DISCLOSURE

A high pressure rotary nozzle device having a rotating shaft is disclosed in my U.S. Pat. No. 7,635,096, which is incorporated herein by reference in its entirety. The hollow shaft in this device rotates within a fixed housing wherein the axial force which acts upon the shaft due to the fluid pressure at the shaft inlet is balanced, eliminating the need for mechanical bearings.

This nozzle is particularly well suited to industrial uses where the operating parameters can be in the range of 1,000 to 40,000 psi, rotating speeds of 1000 rpm or more and flow rates of 2 to 50 gpm. The hollow shaft in this device is provided with a "bleed hole" leading from the central bore through the hollow shaft to its exterior. This allows a small portion of pressurized fluid to reach a chamber formed within the nozzle housing outside the exterior of the forward portion of the nozzle shaft. The fluid pressure in this chamber acts upon the nozzle shaft with a sufficient axial component so as to balance the corresponding axial component against the nozzle shaft created by the internal fluid pressure. This chamber, or passage has a frusto-conical tubular shape surrounding a corresponding tapered portion of the shaft which further allows the fluid to flow between the nozzle housing and the shaft to facilitate and lubricate the shaft as it rotates.

Because of the frusto-conical tapered shape of both the exterior surface of the shaft and the complementary interior surface of the housing, the spacing between the housing and the shaft varies slightly with axial movement of the shaft. This movement creates a self balancing effect in which the axial forces upon the shaft remain balanced and there is always some fluid flowing between the shaft and housing which helps decrease contact and resulting wear between these two components.

The rotation of such a nozzle is provided by the reaction forces experienced by the nozzle tip as a result of the redirection of fluid flow outward through offset angled ports in the nozzle tip offset from the longitudinal axis of the nozzle. The redirection of flow is offset from the axis of the nozzle shaft such that the reaction forces apply a torque to the nozzle shaft and tip. At such high pressures the offset angled ports are more than sufficient to provide rotation, or swivel, of the nozzle about its longitudinal axis. A small detachable jet head having a diameter smaller than the body of the nozzle can be attached at the leading end of the nozzle to provide an improved coverage pattern for the high-pressure fluid.

Unless the nozzle tip, i.e., the jet head, has offset angled ports, rotation of the nozzle shaft is not likely to occur. There are some applications, however, where offset angled ports are either undesirable due to a change in driving torque when pressure or flow rate is changed, and undesirable because driving rotation by this method produces very high rotation speeds (20,000-30,000 rpm). Thus there is also a need for a rotary nozzle that is axially self balanced as above described, but in which the rotary nozzle shaft is driven by a method resulting in slower rotation speeds, in a range on the order of 2000 to 4000 rpm, rather than relying on offset angled reaction forces to provide the rotational force on the nozzle shaft.

SUMMARY OF THE DISCLOSURE

A nozzle in accordance with the present disclosure provides a simplified structure which effectively balances any axial thrust force, without need for mechanical bearings, while at the same time imparting a rotational force to cause rotation of the nozzle without requiring offset nozzle ports.

One embodiment of such a nozzle device has a generally cylindrical overall outer shape so that it can be inserted into pipes and other tubular passages. The device has a hollow tubular housing body fastened to a high pressure inlet. Captured between the tubular body and the inlet nut is a hollow, tapered, rotatable swivel shaft. This shaft is rotatably supported on a tubular stem portion of the inlet nut. The outer surface of the shaft has a generally frusto-conical shape that tapers down toward the discharge of the nozzle device. The inner surface of the hollow shaft has a cylindrical shape complementary to the stem portion upon which it rides. The inside surface of the tubular body has a frusto-conical tapered shape complementary to the frusto-conical shape of the outer surface of the shaft such that together they form a balancing chamber or passage therebetween.

The inlet nut and its stem portion each has a central bore therethrough that directs fluid flow from a high pressure fluid source through the nut and stem portion and then through a spray jet head attached to the discharge end of the shaft. The rotatable swivel shaft has a plurality of passages, each extending through the shaft from the inner to the outer surface of the shaft to a circumferential channel in the outer surface. The channel joins helical grooves formed in the outer surface of the shaft. Fluid flow in these grooves during operation imparts a rotational force on the shaft causing it to rotate about the stem portion of the inlet nut. Thus this rotational force eliminates the need for providing offset angled ports in the spray head or nozzle tip. This allows driving the rotation of the shaft at a desired slower rotation speed. Since the nozzle spray is directed out of the nozzle tip in a direction that is not offset from the longitudinal axis of the nozzle, rotation speed is not dependent on the pressure and flow rate through the nozzles. This same fluid flow, before reaching and exiting the helical grooves, provides lubrication between first the stem portion of the inlet nut and the shaft and then between the inner surface of the housing and the outer surface of the shaft such that solid bearings are not required.

Embodiments of a fluid bearing nozzle assembly for spraying high pressure fluid in accordance with this disclosure each include a hollow cylindrical body, an inlet nut fastened to the cylindrical body, and a hollow tubular shaft member coaxially carried within the housing body and captured between the inlet nut and the body. The inlet nut has a stem portion extending into a central bore through the shaft member. The stem portion forms an inlet bearing area rotatably carrying the shaft member thereon. The shaft member has an outlet end near an outlet end of the housing body that receives a spray head fastened thereto for rotation of the head with the shaft member. The inlet nut has a central passage to conduct fluid through the inlet nut to said outlet end of the shaft member.

An inner wall of the housing body and an outer portion of the shaft have complementary surface shapes together forming a regulating passage therebetween. The shaft member has one or more bores communicating between the inlet bearing area and the regulating passage, wherein pressure of fluid within the regulating passage acts axially upon the shaft to counter axial force on the shaft resulting from fluid pressure acting upon an inlet end of the shaft. Furthermore, the outer portion of the shaft has at least one helical groove therearound extending from the one or more bores along a substantial portion of the outer portion of the shaft. Fluid flow through the regulating passage and the helical groove imparts a rotational torque on the shaft to cause rotation of the shaft on the stem portion of the inlet nut.

In one embodiment the inner wall of the housing body and the outer portion of the shaft have complementary frustoconical shapes. In this embodiment there are one or more bores that communicate to an annular channel in the outer surface of the shaft. The shaft has two counter rotating grooves around the shaft leading from the annular channel to opposite ends of the shaft. The fluid rotate in different directions in both grooves, thereby generate torque on the shaft in only one direction.

In another embodiment, the inner wall of the housing body has a stepped cylindrical shape with a large diameter portion and a small diameter portion with a shoulder therebetween. In this case, the shaft has a complementary stepped cylindrical shape with a shoulder therebetween and the one or more bores communicate with the shoulder of the shaft. Here the shaft has a single helical groove that extends from the shoulder around a substantial portion of the length of the large diameter portion of the shaft.

In each of these embodiments, a rear face of the shaft and the inlet nut form therebetween a balancing chamber. The hollow body has one or more weep holes communicating with the balancing chamber for relieving fluid pressure from within the balancing chamber. Preferably the nozzle also includes a cylindrical shroud fastened around the hollow body that extends around a portion of the spray head. The weep holes in the hollow body communicate between the balancing chamber and a gap between the shroud and the hollow body. This shroud primarily protects the rotating spray head from damage and prevents contact between the spray head and the object or surface being cleaned from stalling rotation of the head.

Further features, advantages and characteristics of the embodiments of this disclosure will be apparent from reading the following detailed description when taken in conjunction with the drawing figures.

DETAILED DESCRIPTION

Figure 1:
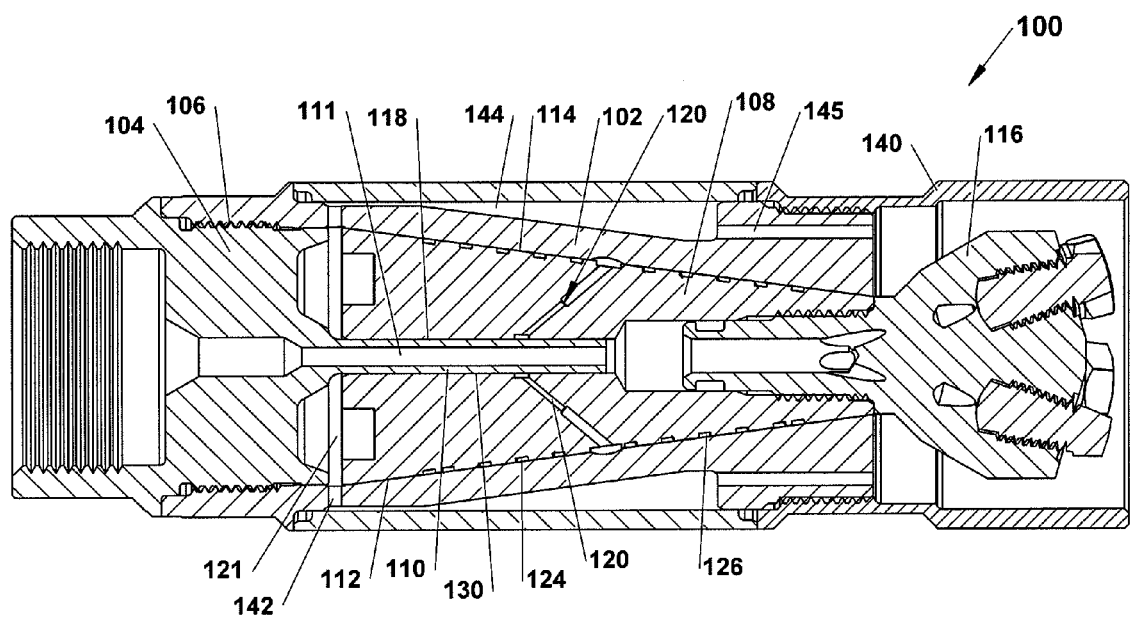
FIG. 1 is a cross-section of the nozzle device of one exemplary embodiment in accordance with this disclosure.
Figure 2:
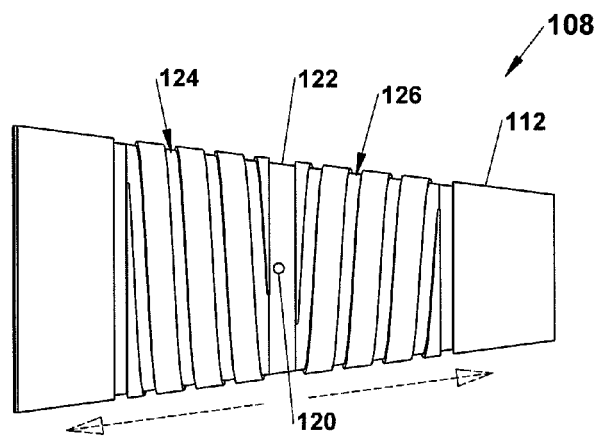
FIG. 2 is a side view of the frusto-conical rotatable shaft removed from the nozzle device shown in FIG. 1.

One embodiment of a nozzle device 100, as is shown in cross section in FIG. 1, has a generally cylindrical overall outer shape so that it can be inserted into pipes and other tubular passages. The device 100 has a hollow tubular body 102 fastened to a high pressure inlet nut 104. The inlet nut 104 is fastened to the body 102 preferably via a threaded connection 106. Captured between the tubular body 102 and the inlet nut 104 is a hollow, tapered, rotatable swivel shaft 108. The shaft 108 is rotatably supported on a tubular stem portion 110 projecting axially out of the inlet nut 104. The outer surface 112 of the shaft 108 has a generally frusto-conical shape that tapers down toward the discharge of the nozzle device 100. The inner surface 118 of the shaft 108 has a cylindrical shape complementary to the stem portion 110 upon which it resides. The inside surface 114 of the tubular body 102 has a frusto-conical tapered shape complementary to the frusto-conical shape of the outer surface 112 of the shaft 108 such that together they form a balancing passage therebetween.

The stem portion 110 of the inlet nut 104 forms an inlet bearing area for radially supporting the shaft 108. A spray jet head 116 is fastened to the discharge or outlet end of the shaft 108, via conventional means such as a threaded connection, so that both shaft 108 and head 116 rotate together as an integral unit with the head 116 forming the nozzle tip. The advantage here is that various different jet heads 116 may be attached to the shaft 108 depending on the particular cleaning task to be performed.

The inlet nut 104 and its stem portion 110, have a central bore 111 therethrough that directs fluid flow from a high pressure fluid source through the nut 104 into and through ports in the spray head 116. The rotatable swivel shaft 108 has a plurality of passages 120 therethrough, each extending from the inner surface 118 of the shaft 108 to the outer surface 112 of the shaft 108. These passages 120 exit into a preferably centrally located circumferential channel 122 in the outer surface 112. The channel 122 joins counter-revolution helical grooves or channels 124 and 126 formed in the outer surface 118 of the shaft 108. Groove 126 spirals in a first direction around the shaft 108 toward the discharge end of the shaft 108. Groove 124 spirals in an opposite second direction around the shaft 108 toward the inlet end of the shaft 108.

During nozzle operation, these counter-revolution helical grooves 124 and 126 act to impart a moment, or rotational force, to the shaft to rotate the shaft 108 about the stem portion 110, and hence rotate the spray head 116. The shaft 108 in the device 100 effectively rotates at speeds of preferably between about 2000 to 3000 rpm.

Finally, a tubular shroud 140 is preferably threadably fastened as a sleeve over and to the housing body 102 to protect the spray head 116 during insertion and retraction of the nozzle 100 from tubular passages or vessels into which the nozzle device 100 is inserted. This tubular shroud 140 is fixed to the body 102 and does not rotate during nozzle operation. Although not shown in FIG. 1, each of the threaded connections also may preferably include an elastomeric seal ring between the threaded relatively stationary parts to eliminate fluid leakage through the threaded connections between the various components. These include the threaded connections between head 116 and shaft 108, body 102 and inlet nut 104, and shroud 140 to body 102.

During operation, high pressure fluid is introduced through the inlet nut 104 into the central bore 111 in the inlet nut 104. This high pressure fluid passes through stem portion 110 into and through the head 116. A portion of the high pressure fluid is redirected such that it leaks back (to the left in FIG. 1) around the stem portion 110 constituting a leakage path 130 along the inlet bearing area, i.e., in the clearance region between the outer surface of the stem portion 110 and the inner surface 118 of the shaft 108. Part of this fluid passing through leakage path 130 flows into the annular chamber 121 between the inlet nut 104 and the shaft 108, and then out through weep holes 142 into the gap 144 between the housing 102 and the shroud 140. This leakage fluid then flows to atmosphere via ports 145 to the open end of the shroud 140. Another portion of the fluid in leakage path 130 is diverted outward through passages 120 in the shaft 108 to the circumferential channel 122 formed in the outer surface of the shaft 108 and thus into a frusto-conical tapered interface or balancing chamber 146 formed between the inside surface 114 of the body 102 and the outer surface 112 of the shaft 108.

A portion of the fluid in channel 122 diverges and flows outward in opposite spiral directions through this balancing chamber 146, first forward along helical groove 126 to exit the nozzle 100 around the head 116 and also rearward along helical groove 124 to the clearance space that forms annular chamber 121 between the inlet nut 104 and the rear face of the shaft 108. This portion of the fluid then joins the portion of leakage 130 from along the stem 110 and passes through weep holes 142, then passes out through ports 145 and the shroud 140 to atmosphere.

During operation, the shaft 108 becomes axially dynamically balanced on the stem 110 such that mechanical bearings are not required. The lubricity of the fluid flowing through these leakage paths 130 and through the balancing chamber 146 sufficiently supports and lubricates the shaft 108 and attached spray head 116 such that bearings are not required. Furthermore, the fluid flow through the helical grooves 124 and 126 provides the rotational torque necessary to rotate the shaft 108 and its attached spray head 116. This torque generating function is performed by the leakage fluid flow. Therefore offset nozzle tips are not necessary to rotate the nozzle head 116 as in previous designs. However, where higher rotational speed is desired, offset nozzle tips may be advantageously employed.

Figure 3:
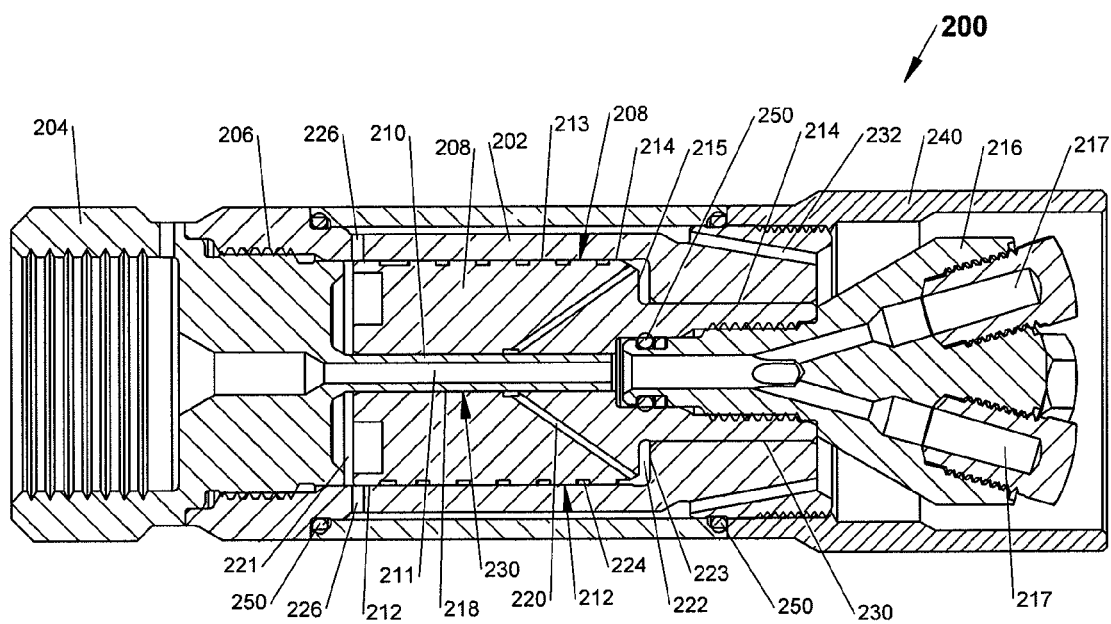
FIG. 3 is a cross-section of a nozzle device of another exemplary embodiment in accordance with the present disclosure.

Another exemplary nozzle device 200 is shown in FIG. 3. The nozzle device 200 operates in a similar manner to device 100. The device 200 has a hollow tubular body 202 fastened to a high pressure inlet nut 204. The inlet nut 204 is fastened to the body 202 preferably via a threaded connection 206. Captured between the tubular body 202 and the inlet nut 204 is a hollow cylindrical, rotatable swivel shaft 208.

Figure 4:
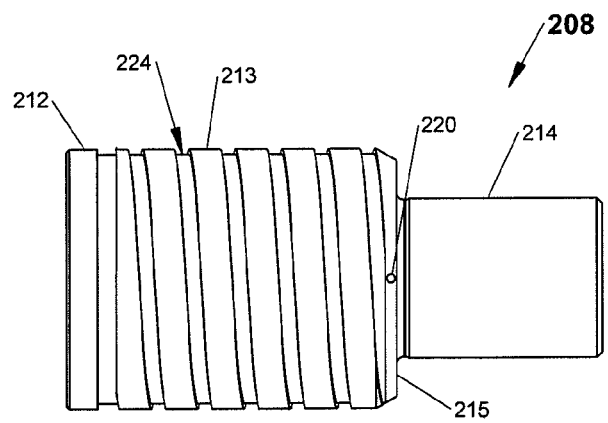
FIG. 4 is a separate side view of a rotatable shaft removed from the nozzle device shown in FIG. 3.
Figure 5:
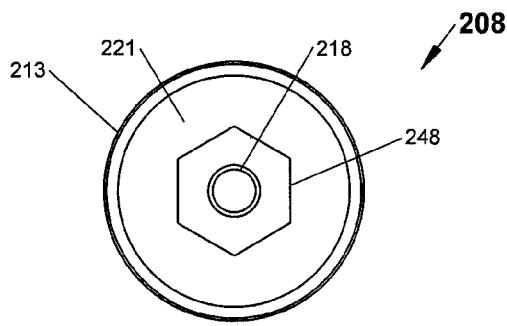
FIG. 5 is a rear end view of the rotatable shaft shown in FIG. 4.

This shaft 208 is separately shown in side view in FIG. 4, and in a rear end view in FIG. 5. The shaft 208 is rotatably supported on a tubular stem portion 210 of the inlet nut 204 that projects axially from the main body of the inlet nut 204. The outer surface 212 of the shaft 208 has a first cylindrical portion 213 and a reduced diameter cylindrical portion 214 forming an annular shoulder 215 therebetween. The inside surface 214 of the tubular body 202 has a shape complementary to the stepped cylindrical shape of the outer surface 212 of the shaft 208 such that together they form a balancing passage therebetween.

The inner surface 218 of the shaft 208 forms a straight bore that has a cylindrical shape complementary to that of the stem portion 210 upon which it resides. A rear end, or inlet view, of the shaft 208 is shown in FIG. 5. The central bore 218 is surrounded by an annular recess forming part of the balancing chamber 221. The interior sides of this recess around the bore 218 are straight so as to form a hexagonal nut shape used to hold the shaft 208 during assembly and disassembly of the shaft 208 to the spray head 216.

The stem portion 210 of the inlet nut 204 forms an inlet bearing area for radially supporting the shaft 208. A spray jet head 216 is fastened to the discharge or outlet end of the shaft 208, via conventional means such as a threaded connection, so that both shaft 208 and head 216 rotate together as an integral unit with the head 216 forming the nozzle tip. The advantage here is that various different jet heads 216 may be attached to the shaft 208 depending on the particular cleaning task to be performed.

The inlet nut 204 and its stem portion 210, has a central bore 211 therethrough that directs fluid flow from a high pressure fluid source, through the nut 204, the bore 211, and then into and through ports 217 in the spray head 116. The rotatable swivel shaft 108 has a plurality of passages 220 therethrough, preferably at least two, each extending from the inner surface 218 of the shaft 208 to the outer surface 212 of the shaft 208. These passages 220 exit into an annular space or chamber 222 formed between the shoulder 215 and a complementarily shaped inner shoulder surface 223 of the housing 202. The single helical groove 224 communicates with this space 222. Groove 224 spirals around the shaft 208 from the space 222 toward the inlet end of the shaft 208. The direction of the helical groove 224 determines the direction of rotation of the shaft 208, and hence the rotary spray head 216. For example, if the groove 224 spirals clockwise from the space 222 around the shaft 208 toward the inlet end of the shaft 208, then rotation will be counterclockwise.

Finally, a tubular shroud 240 is preferably threadably fastened as a sleeve over and to the housing body 202 to protect the spray head 216 during insertion and retraction of the nozzle 200 from tubular passages or vessels into which the nozzle device 200 is inserted. This tubular shroud 240 is fixed to the body 202 during nozzle operation and does not rotate.

At the rear of the swivel shaft 208 in the space between the inlet nut 204 and the shaft 208 are a pair of weep holes 226 that lead from this space through the housing 202 into an annular gap 228 between the housing 202 and the shroud 240. The space between the inlet nut 204 and the shaft 208 forms a balancing chamber 221. Fluid that enters this gap 228 then flows to the atmosphere behind the rotary head 216 through passages 232 in the housing 202.

The threaded connections between the housing 202 and the shroud 240 includes two elastomeric seal rings 250. These outer seal rings 250 see only low pressure leak water. An inner seal ring 250 is provided around the rear end portion of the spray head 216 between the threaded connection to the shaft 208. This seal ring 250 sees full high operating fluid pressure. These seal rings 250 prevent fluid leakage past the threaded connections during high pressure operation of the nozzle device 200 and ensure that all the fluid flows either through the useful passages and leakage paths as described herein or through the spray head directly.

During operation, high pressure fluid is first introduced through the inlet nut 204 into the central bore 211 in the inlet nut 204. This high pressure fluid passes through stem portion 210 into and through the head 216. A portion of the high pressure fluid is redirected such that it leaks back (to the left in FIG. 3) around the stem portion 210, constituting a leakage path 230 along the inlet bearing area, i.e., in the clearance region between the outer surface of the stem portion 210 and the inner surface 218 of the shaft 208.

Part of this fluid passing through leakage path 230 flows into the balancing chamber 221 between the inlet nut 204 and the shaft 208, and then out through weep holes 226 into the gap 228 between the housing 202 and the shroud 240. This leakage fluid then flows through passages 232 to atmosphere via the open end of the shroud 240. Another portion of the fluid in leakage path 230 is diverted forward and outward through the passages 220 in the shaft 208 to the space 222. From the space 222, most of this portion of leakage fluid then flows through the helical groove 224 to the balancing chamber 221. A small portion of leakage fluid flows toward the head 216 through the annular clearance space between the reduced diameter portion 214 of the shaft 208 and the housing 202.

During operation, the shaft 208 becomes axially dynamically balanced on the stem 210 such that mechanical bearings are not required. The lubricity of the fluid flowing through these leakage paths 230 and through the balancing chamber 221 sufficiently supports and lubricates the shaft 208 and attached spray head 216 such that bearings are not required. Furthermore, the fluid flow through the helical groove 224 provides the rotational torque necessary to rotate the shaft 208 and its attached spray head 216. This torque generating function is performed entirely by the leakage fluid flow. Therefore offset nozzle tips are not necessary to rotate the nozzle head 216 as in previous designs. However, where high rotational speed is desired, offset nozzle tips may also be advantageously employed in these embodiments, since the head 116 and 216 are interchangeable with other head designs.

Balancing in this embodiment 200 occurs because, as the fluid pressure in the space 222 exerted by the leakage fluid increases, an axial force pushes the shaft 208 rearward, or to the left in FIG. 3. When this occurs, the rear end of the shaft 208 partially closes off the weep holes 226. This reduces the leakage rate, which in turn increases the axial pressure acting on the left end of the shaft 208 in opposition to the axial force exerted in space 222 until a balance between the axially opposing forces is achieved.

In this embodiment 200, it is therefore the interaction of the rear face of the swivel shaft 208 with the opening to the weep holes 228 that actually regulates the balancing of axial forces during nozzle operation. The presence of the helical groove 224 determines the direction of and speed of rotation of the swivel shaft 208. The dimensions of the space between the shaft 208 and housing 202, and the inner wall of the shaft 208 and the outer wall of the stem 210 are such that a clearance of between 0.0005 and 0.0010 is preferred.

In accordance with the features and benefits described herein, the present invention is intended to be defined by the claims below and their equivalents.

What is claimed is:

1. A fluid bearing nozzle assembly for spraying high pressure fluid comprising:
    a hollow cylindrical body;
    an inlet nut fastened to the cylindrical body; and
    a hollow tubular shaft member coaxially carried within the housing body and captured between the inlet nut and the body, the inlet nut having a stem portion extending into a central bore through the shaft member, the stem portion forming an inlet bearing area rotatably carrying the shaft member thereon, the shaft member having an outlet end near an outlet end of the housing body, the outlet end of the shaft member receiving a spray head fastened thereto for rotation of the head with the shaft member, said inlet nut having a central passage to conduct fluid through the inlet nut to said outlet end of the shaft member;
    an inner wall of the housing body and an outer portion of the shaft having complementary surface shapes together forming a regulating passage therebetween, said shaft member having one or more bores communicating between the inlet bearing area and the regulating passage, wherein pressure of fluid within the regulating passage acts axially upon the shaft to counter axial force on the shaft resulting from fluid pressure acting upon an inlet end of the shaft, and wherein the outer portion of the shaft has a helical groove there-around extending from the one or more bores along a substantial portion of the outer portion of the shaft and wherein fluid flow through the regulating passage and the helical groove imparts a rotational torque on the shaft to cause rotation of the shaft on the stem portion of the inlet nut.

2. The nozzle according to claim 1 wherein the inner wall of the housing body and the outer portion of the shaft have complementary frusto-conical shapes.

3. The nozzle according to claim 2 wherein the one or more bores communicates to an annular channel in the outer surface of the shaft and the shaft has two counter rotating grooves around the shaft leading from the annular channel to opposite ends of the shaft.

4. The nozzle according to claim 1 wherein the inner wall of the housing body has a stepped cylindrical shape with a large diameter portion and a small diameter portion with a shoulder therebetween.

5. The nozzle according to claim 4 wherein the shaft has a complementary stepped cylindrical shape with a shoulder therebetween and the one or more bores communicate with the shoulder of the shaft.

6. The nozzle according to claim 5 wherein the shaft has a single helical groove that extends from the shoulder around a substantial portion of the length of the large diameter portion of the shaft.

7. The nozzle of claim 1 wherein a rear face of the shaft and the inlet nut form therebetween a balancing chamber and wherein the hollow body has one or more weep holes communicating with the balancing chamber for relieving fluid from within the balancing chamber.

8. The nozzle of claim 7 further comprising a cylindrical shroud fastened around the hollow body that extends around a portion of the spray head, wherein the weep holes in the hollow body communicate between the balancing chamber and a gap between the shroud and the hollow body.

9. The nozzle of claim 8 wherein fluid in the gap is relieved to atmosphere through at least one passage between the shroud and the housing body.

10. The nozzle of claim 7 wherein the balancing chamber and regulating passage connect together and a portion of fluid flow through the central bore flows along the inlet bearing area to the balancing chamber and to the regulating passage.

11. A nozzle assembly for spraying high pressure fluid against an object comprising:
    a hollow cylindrical body;
    an inlet nut fastened to the cylindrical body;
    a hollow tubular shaft member coaxially carried within the housing body and captured between the inlet nut and the body, the inlet nut having a stem portion extending into a central bore through the shaft member, the stem portion forming an inlet bearing area rotatably carrying the shaft member thereon, the shaft member having an outlet end near an outlet end of the housing body, the outlet end of the shaft member receiving a spray head fastened thereto for rotation of the head with the shaft member, said inlet nut having a central passage to conduct fluid through the inlet nut to said outlet end of the shaft member; and
    a tubular shroud around the hollow body, the shaft member and the spray head, the shroud fastened to a portion of the hollow body;
    an inner wall of the housing body and an outer portion of the shaft having complementary surface shapes together forming a regulating passage therebetween, said shaft member having one or more bores communicating between the inlet bearing area and the regulating passage, wherein pressure of fluid within the regulating passage acts axially upon the shaft to counter axial force on the shaft resulting from fluid pressure acting upon an inlet end of the shaft, and wherein the outer portion of the shaft has a helical groove there-around extending from the one or more bores along a substantial portion of the outer portion of the shaft and wherein fluid flow through the regulating passage and the helical groove imparts a rotational torque on the shaft to cause rotation of the shaft on the stem portion of the inlet nut, and wherein a portion of fluid flow through the regulating passage passes through one or more weep holes through the housing body to a gap formed between the housing body and the shroud.

12. The nozzle according to claim 11 wherein the inner wall of the housing body and the outer portion of the shaft have complementary frusto-conical shapes.

13. The nozzle according to claim 12 wherein the one or more bores communicates to an annular channel in the outer surface of the shaft and the shaft has two counter rotating grooves around the shaft leading from the annular channel to opposite ends of the shaft.

14. The nozzle according to claim 11 wherein the inner wall of the housing body has a stepped cylindrical shape with a large diameter portion and a small diameter portion with a shoulder therebetween.

15. The nozzle according to claim 14 wherein the outer surface of the shaft has a complementary stepped cylindrical shape with a shoulder therebetween and the one or more bores communicate with the shoulder of the shaft.

16. The nozzle according to claim 15 wherein the shaft has a single helical groove that extends from the shoulder around a substantial portion of the length of the large diameter portion of the shaft.

17. The nozzle of claim 11 wherein a rear face of the shaft and the inlet nut form therebetween a balancing chamber and wherein the hollow body has one or more weep holes communicating with the balancing chamber for relieving fluid from within the balancing chamber.

18. The nozzle of claim 17 wherein the balancing chamber and regulating passage connect together and a portion of fluid flow through the central bore flows along the inlet bearing area to the balancing chamber and to the regulating passage.

19. A nozzle assembly for spraying high pressure fluid against an object comprising:
a hollow cylindrical body;
an inlet nut fastened to the cylindrical body;
a hollow tubular shaft member coaxially carried within the housing body and captured between the inlet nut and the body, the inlet nut having a stem portion extending into a central bore through the shaft member, the stem portion forming an inlet bearing area rotatably carrying the shaft member thereon, the shaft member having an outlet end near an outlet end of the housing body, the outlet end of the shaft member receiving a spray head fastened thereto for rotation of the head with the shaft member, said inlet nut having a central passage to conduct fluid through the inlet nut to said outlet end of the shaft member; and a tubular shroud around the hollow body, the shaft member and the spray head, the shroud fastened to a portion of the hollow body;

an inner wall of the housing body and an outer portion of the shaft having complementary surface shapes together forming a regulating passage therebetween, said shaft member having one or more bores communicating between the inlet bearing area and the regulating passage, wherein pressure of fluid within the regulating passage acts axially upon the shaft to counter axial force on the shaft resulting from fluid pressure acting upon an inlet end of the shaft, and wherein the outer portion of the shaft has a helical groove there-around extending from the one or more bores along a substantial portion of the outer portion of the shaft and wherein fluid flow through the regulating passage and the helical groove imparts a rotational torque on the shaft to cause rotation of the shaft on the stem portion of the inlet nut, and wherein a portion of fluid flow through the regulating passage passes through one or more weep holes through the housing body to a gap formed between the housing body and the shroud, wherein a rear face of the shaft and the inlet nut form therebetween a balancing chamber communicating with the one or more weep holes for relieving fluid from within the balancing chamber.

20. The nozzle according to claim 19 wherein the inner wall of the housing body and the outer portion of the shaft have complementary frusto-conical shapes.

21. The nozzle according to claim 20 wherein the one or more bores communicates to an annular channel in the outer surface of the shaft and the shaft has two counter rotating grooves around the shaft leading from the annular channel to opposite ends of the shaft.

22. The nozzle according to claim 19 wherein the inner wall of the housing body has a stepped cylindrical shape with a large diameter portion and a small diameter portion with a shoulder therebetween.

23. The nozzle according to claim 22 wherein the shaft has a complementary stepped cylindrical shape with a shoulder therebetween and the one or more bores communicate with the shoulder of the shaft.

24. The nozzle according to claim 23 wherein the shaft has a single helical groove that extends from the shoulder around a substantial portion of the length of the large diameter portion of the shaft.

25. The nozzle of claim 19 wherein the balancing chamber and regulating passage connect together and a portion of fluid flow through the central bore flows along the inlet bearing area to the balancing chamber and to the regulating passage.

* * * * *

UNITED STATES PATENT AND TRADEMARK OFFICE
CERTIFICATE OF CORRECTION

| | | |
|---|---|---|
| PATENT NO. | : 8,544,768 B2 | Page 1 of 1 |
| APPLICATION NO. | : 12/829661 | |
| DATED | : October 1, 2013 | |
| INVENTOR(S) | : Douglas E. Wright | |

It is certified that error appears in the above-identified patent and that said Letters Patent is hereby corrected as shown below:

In the Specification,

Column 4, lines 29-30: delete "outer surface 118" and insert --outer surface 112--.

Signed and Sealed this
Seventh Day of October, 2014

Michelle K. Lee
*Deputy Director of the United States Patent and Trademark Office*